(12) United States Patent
Kapoor et al.

(10) Patent No.: US 7,805,420 B2
(45) Date of Patent: Sep. 28, 2010

(54) VERSIONING AND CONCURRENCY CONTROL FOR MULTIPLE CLIENT ACCESS OF DATA

(75) Inventors: Rahul Kapoor, Bellevue, WA (US); Rolando Jimenez Salgado, Redmond, WA (US); Kaushik Raj, Issaquah, WA (US); Satish Thatte, Redmond, WA (US); Xiaoyu Wu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 169 days.

(21) Appl. No.: 11/602,069

(22) Filed: Nov. 20, 2006

(65) Prior Publication Data

US 2008/0120297 A1    May 22, 2008

(51) Int. Cl.
*G06F 17/30* (2006.01)
(52) U.S. Cl. .................. 707/695; 707/394; 707/783
(58) Field of Classification Search ............... None
See application file for complete search history.

(56) References Cited

U.S. PATENT DOCUMENTS

| | | |
|---|---|---|
| 5,701,480 A | 12/1997 | Raz |
| 6,012,094 A | 1/2000 | Leymann et al. |
| 6,216,126 B1 | 4/2001 | Ronstrom |
| 6,266,666 B1 | 7/2001 | Ireland et al. |
| 6,879,997 B1 | 4/2005 | Ketola et al. |
| 6,892,210 B1 | 5/2005 | Erikson et al. |
| 6,973,657 B1 | 12/2005 | Ahmad et al. |
| 6,983,293 B2 | 1/2006 | Wang |
| 7,080,158 B1 * | 7/2006 | Squire .................. 709/245 |
| 7,089,253 B2 | 8/2006 | Hinshaw et al. |
| 7,103,597 B2 | 9/2006 | McGoveran |
| 7,240,826 B2 * | 7/2007 | Abecassis et al. ........ 235/376 |
| 2002/0133508 A1 | 9/2002 | LaRue et al. |
| 2003/0131045 A1 | 7/2003 | McGee et al. |
| 2004/0111698 A1 | 6/2004 | Soong et al. |
| 2004/0172423 A1 | 9/2004 | Kaasten et al. |
| 2005/0050142 A1 | 3/2005 | Capone et al. |
| 2005/0149481 A1 | 7/2005 | Hesselink et al. |
| 2005/0149601 A1 | 7/2005 | Cox et al. |
| 2005/0198132 A1 | 9/2005 | Vellante et al. |
| 2005/0210152 A1 | 9/2005 | Hawes |

(Continued)

OTHER PUBLICATIONS

Cavazos et al., "A 3-Tiered Client-Server Distributed Database System Component-Based", http://delivery.acm.org/10.1145/990000/984813/p79-cavazos.pdf?key1=984813&key2=47801339511&coll=dl=ACM&CFID=1515151515&CFTOKEN=618461.

(Continued)

*Primary Examiner*—Baoquoc N To

(57) ABSTRACT

Versioning and concurrency control architecture of data operations on data of a data source by multiple independent clients of a user. Data operation messages between the clients and the data source are intercepted and tracked for serialization control to a data view instance of the data source. The architecture can be located as an always-on centrally-located system (e.g., mid-tier), accommodate data operations that include create, read, update, delete, and query (CRUDQ) against data sources, and provides support for distributed transactions, locking, versioning, and reliable messaging, for example, for data sources that do not expose such capabilities. A hash is employed for version control and to control changes at the data source. The central system also provides logic for the individual CRUDQ operations, and granular error classification to enable retries whenever possible.

20 Claims, 15 Drawing Sheets

U.S. PATENT DOCUMENTS

| | | |
|---|---|---|
| 2006/0069809 A1 | 3/2006 | Serlet |
| 2006/0136441 A1 | 6/2006 | Fujisaki |
| 2007/0072506 A1 | 3/2007 | Poczo |
| 2008/0120362 A1 | 5/2008 | Kapoor et al. |

OTHER PUBLICATIONS

Liebig et al., "Middleware Mediated Transactions", http://www.research.ibm.com/AEM/pubs/mmt_doa2001.pdf.

Manassiev et al., "Exploiting Distributed Version Concurrency in a Transactional Memory Cluster", Date: Mar. 2006, http://delivery.acm.org/10.1145/1130000/1123002/p198-manassiev_pdf?.

Kumara et al., "An Agent-Based Approach for Universal Personal Computing", pp. 18-21, IEEE, Dec. 2000.

Peer, High Performance File Synchronization and Replication Software, Date: 2004, available at http://www.peersoftware.com/solutions/peersync/product_pdf/ps71overview.pdf.

Boukerche et al., A Hybrid Solution to Support Multiuser 3D Virtual Simulation Environments in Peer-to-Peer Networksds, pp. 61-68, Eighth IEEE International Symposium on Distributed Simulation and Real-Time Applications (DS-RT'04), Oct. 2004.

Kanhere et al., "Service-oriented Middleware for Peer-to-Peer Computing", pp. 98-103, 3rd IEEE International Conference on Industrial Informatics, Aug. 2005.

* cited by examiner

VERSIONING AND CONCURRENCY CONTROL FOR MULTIPLE CLIENT ACCESS OF DATA

BACKGROUND

The rapid evolution in hardware and software technology is making it more the norm rather than the exception that a user will have multiple computing devices with which to interact with data and programs. For example, it is commonplace for a user to have a desktop computer, and one or more additional computing devices such as a portable computer and a mobile device (e.g., cell phone) with which to access network services.

A problem with having multiple devices, however, is maintaining an equivalent set of client information on all the user devices, especially when the user operates such devices between online and offline modes. For example, a user may conduct initial activity via a desktop computer and then leave on a business trip with a laptop computer that lacks the desired updated information and settings generated on the desktop computer. Moreover, while on the business trip, if the user performs data operations offline using the portable computer, these operations may not be propagated to the user's desktop computer.

While not such a pressing problem in the home environment, maintaining equivalency of multiple clients in business environments can pose a complex and costly problem when the user devices are brought online and perform data operations against data sources such as line-of-business (LOB). For example, one conventional problem with data operations against a data source includes the multiple delivery of operations from the different user clients to the data source thereby causing duplicate and lost requests. To minimize this problem data sources should provide reliable messaging support. Another problem with conventional implementations is the need to rely on locking functionality to prevent multiple clients from accessing the same data entity, and distributed transaction support from the data sources. Yet another existing problem is the potential to perform operations on stale data where updates/deletes are based on an older image of data than the data exists in the data sources. However, existing data systems lack support and control for addressing at least these problems in multiple client data access scenarios.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovation is a centrally-located architecture (e.g., at a mid-tier location) that provides versioning and concurrency control when multiple clients attempt to access the same data. Additionally, support is provided for client synchronization of multiple independent client machines of a single user. This facilitates equivalency among clients of the multiple independent computing devices for data operations such as create, read, update, delete, and query (CRUDQ) against data sources. Moreover, the innovation accommodates CRUDQ operations by the clients against data sources which do not expose support for distributed transactions, locking, versioning, and reliable messaging, for example.

In operation, the central system intercepts data operation calls from the clients to the data source as well as the responses from the data source to the client. Version information of data at the data source and client data is tracked by the central system. Accordingly, clients need only access the central system for data state.

Data sources are modeled as comprising of a collection of entities with multiple views defined on each entity. A view is the lowest unit of data on which CRUDQ operations can be performed. The central system tracks bookkeeping information per user and per view instance. The bookkeeping information can comprise a unique identifier for the view instance, a version number, a flag to indicate if the view instance is locked, and a hash of the view instance data.

The hash is employed by the network location to detect when to change the centrally-generated version without needing to store potentially large amounts data at the central location or passing potentially large amounts of data over the communications medium. The central location also provides the logic for individual CRUDQ operations, and granular error classification to enable retries whenever possible.

Additionally, the innovation enables all client machines of the same user to be independent and equivalent thereby obviating the need for a particular machine to be designated as primary or for pre-establishing relationships between the client machines.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
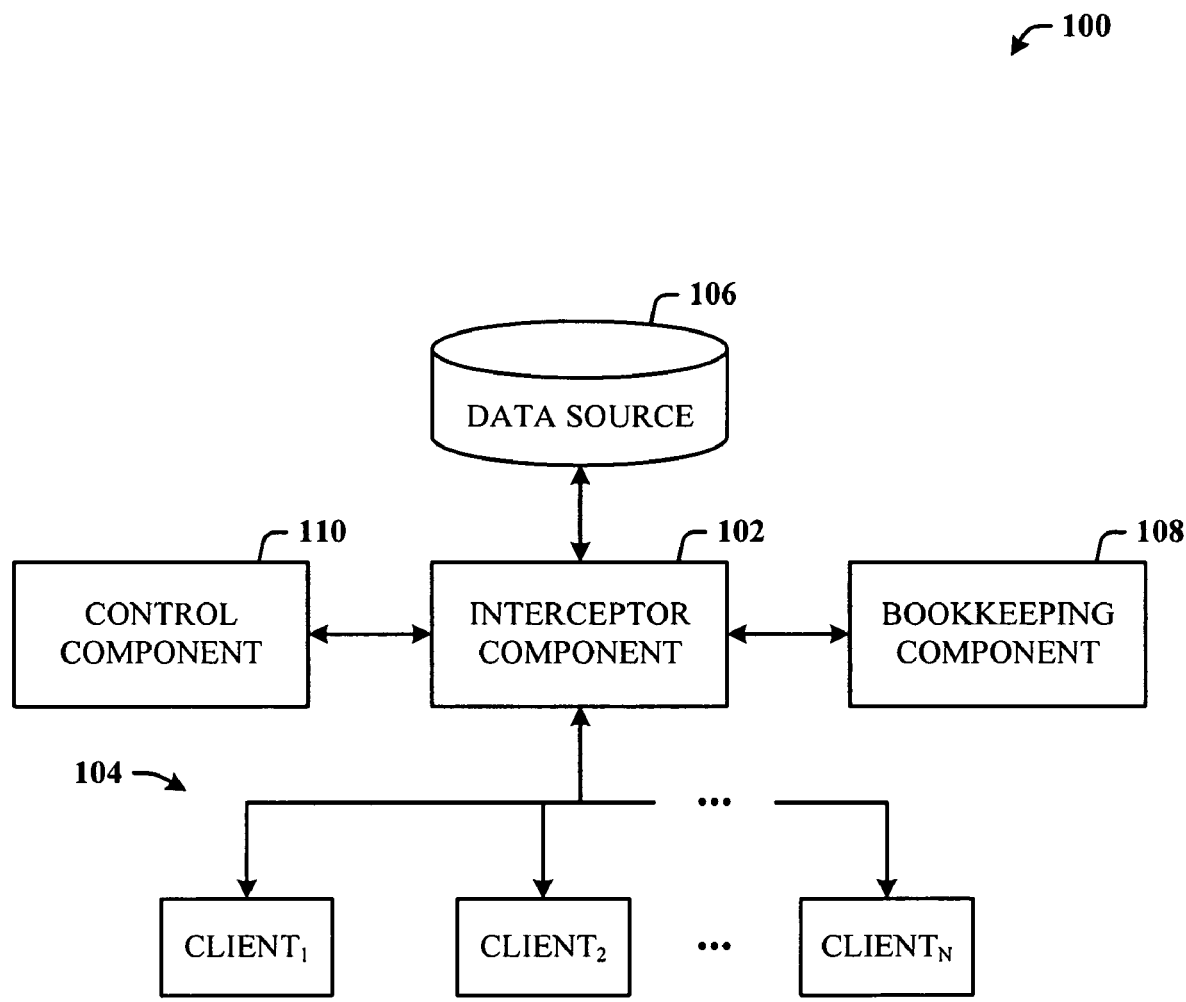
FIG. 1 illustrates a system for centrally located (e.g., network-based) data management using versioning and concurrency control in accordance with the innovative architecture.

The disclosed architecture includes a centrally-located and accessible (e.g., always-on) system (e.g., mid-tier or back-end system) that provides versioning and concurrency control for multiple independent client machines of the same user to perform CRUDQ (create, read, update, delete, and query) operations against a data source. Moreover, the CRUDQ operations can be performed on data sources which do not expose support for distributed transactions, locking, versioning, and reliable messaging, for example. The data source can be client-based, line-of-business (LOB) data source, and/or back-ended data source, for example. Accordingly, the central system facilitates equivalency among clients of multiple independent user computing devices.

In support thereof, the disclosed innovation facilitates the intercept of the calls from the clients to the data source as well as the responses from the data source to the client machines. The central location tracks bookkeeping information per user and per view instance. The bookkeeping information can comprise a unique identifier for the view instance, a version number, a flag to indicate if the view instance is locked and a hash of the view instance data.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Referring initially to the drawings, FIG. 1 illustrates a system 100 for centrally located (e.g., network-based) data management using versioning and concurrency control in accordance with the innovative architecture. The system 100 includes an interceptor component 102 for intercepting data operation messages between a set of clients 104 (denoted $CLIENT_1$, $CLIENT_2$, ..., $CLIENT_N$, where N is a positive integer) and a data source 106, where a data operation messages define data operations on data of the data source 106. More specifically, the interceptor component 102 intercepts data operation message calls from the clients 104 to the data source, and responses by the data source to the clients 104. The data messages can be calls and responses associated with CRUDQ operations on the data, for example. The interceptor component 102 also provides granular error classification for distinguishing connectivity failures and enabling retry of non-idempotent operations. In one implementation, at least the interceptor component 102 is included in an always-on mid-tier system where the clients 104 can obtain ready access, and hence, data synchronization across the clients 104 for data accessed at the data source 106.

The clients 104 of computing devices can be of the same user, such that if the user accesses data of the data source 106 from one user machine (e.g., $CLIENT_1$), changes the data offline, and then chooses to access the same data of the data source from another user machine (e.g., $CLIENT_1$), not only will there be two different versions of the data on the clients 104 thereby losing equivalency among the clients 104, but also causing a potential conflict in data state across on the clients 104 when both of the clients are online and the data source 106 is to be updated. In other words, it is desirable to have equivalency in certain portions of client information among the user client machines. The system 100 facilitates client equivalency for the clients 104 of single user via an automated process (e.g., background) when one user client device (e.g., desktop computer) may not be as updated with respect to certain data or information as another user client (e.g., a portable laptop computer). However, it is to be understood that the clients 104 need not be of the same user, in that versioning and concurrency control can be applied to the clients of different users, as well.

The system 100 can also include a bookkeeping component 108 for tracking and maintaining bookkeeping data associated with the data operations by the set (e.g., one or more) of clients 104 on the data source 106. The bookkeeping data tracked and maintained employs a hash of a view instance of the data being accessed. Data sources are modeled as comprising of a collection of entities with multiple views defined on each entity. A view instance is the lowest unit on which CRUDQ operations can be performed. The bookkeeping data can comprise a unique identifier (ID) for the view instance, a version number associated with the view instance, a flag to indicate if the view instance is locked, and a hash of the view instance data (e.g., view ID, view name, etc.). The central location can track bookkeeping data per user and per view instance.

A control component 110 facilitates version and/or concurrency control over the data being accessed at the data source. Generally, the control component 110 facilitates serialization of the data operations from the clients 104 against the data source 106.

Figure 2:
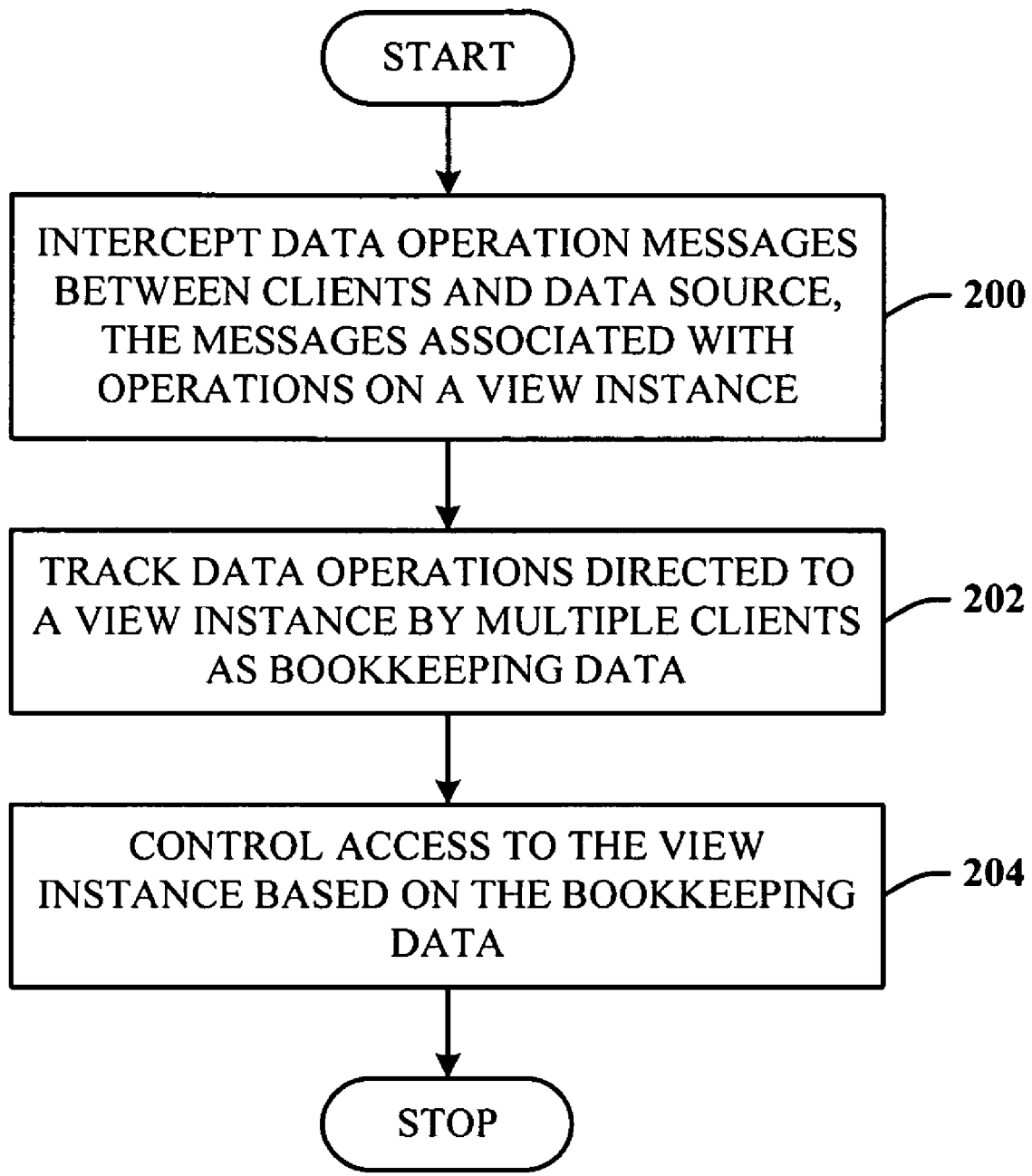
FIG. 2 illustrates a methodology of managing data using versioning and concurrency control in accordance with the innovation.

FIG. 2 illustrates a methodology of managing data using versioning and concurrency control in accordance with the innovation. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, data operation messages between multiple clients and a data source are intercepted, the data operation messages associated with data operations on a view instance at the data source. At 202, data operations directed to a view instance by the multiple clients are tracked as bookkeeping data. At 204, access to the view instance is controlled based on the bookkeeping data.

Figure 3:
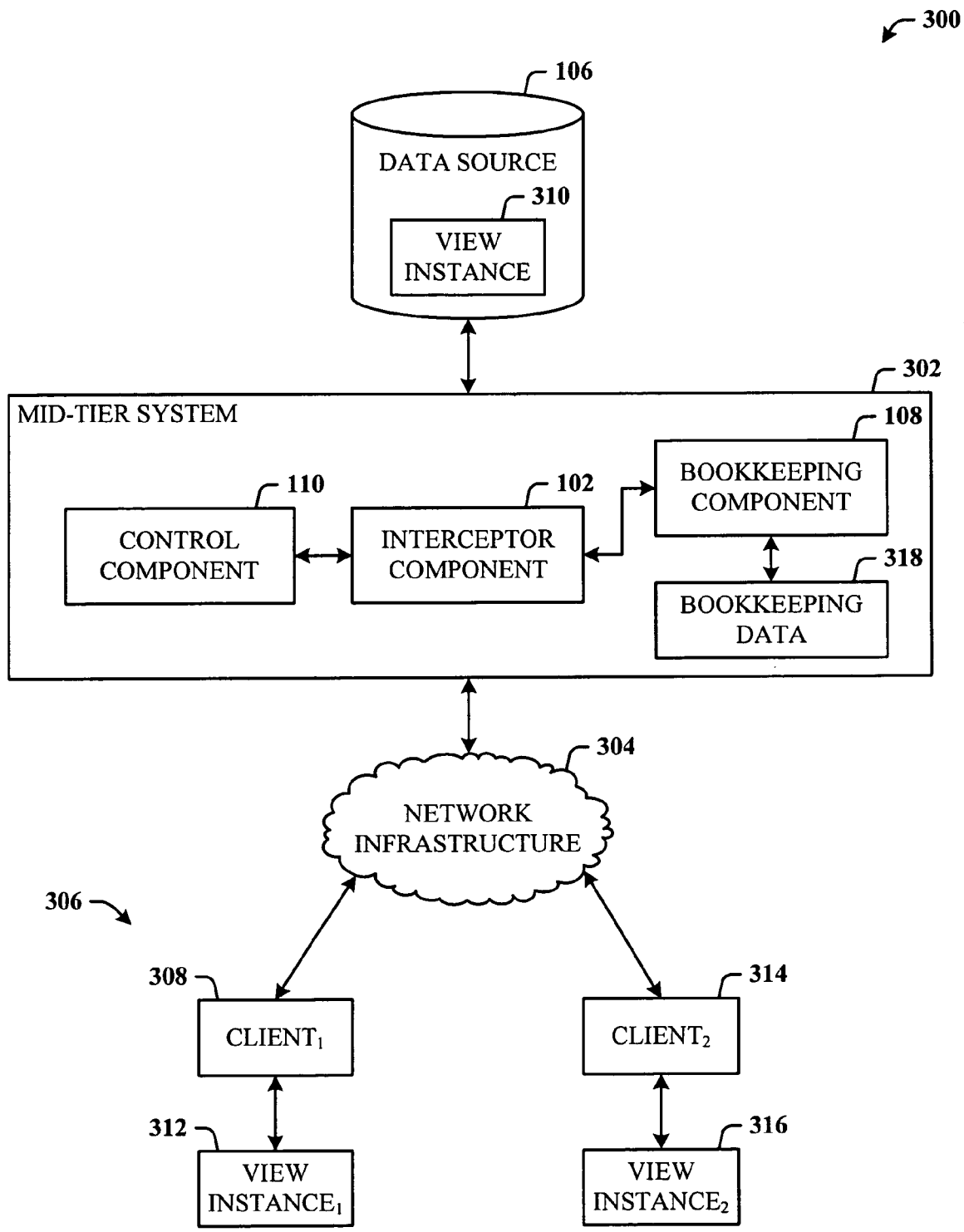
FIG. 3 illustrates an alternative system where a mid-tier system hosts the intercept functionality for data operation calls and responses.

Referring now to FIG. 3, there is illustrated an alternative system 300 where a mid-tier system 302 hosts the intercept functionality for data operation calls and responses. The mid-tier system 302 is disposed on a network infrastructure 304 where the data operation messages can be intercepted between user clients 306 and the data source 106 (e.g., an LOB data source or back-end data source). Here, a user of a first client 304 connects to the data source 106 for data operations on a data having a view instance 310. The user of the first client 304 (e.g., desktop computer) accesses the data source view instance 310 and downloads a copy as a client instance 312 (denoted VIEW INSTANCE$_1$). The user then transfers (or obtains directly from the data source 106) the data to a second user client 314, edits the view instance 312 on the second client 314 thereby generating a new and different view instance 316. Note, however, that these can be two different users on corresponding different machines accessing the same view instance on the data source 106. Thus, once both clients 306 are online, the data source view instance 310 needs to be updated, and the clients 306 made equivalent by updating the first view instance 312 of the first client.

Given the above components (102, 108, and 110), an algorithm can be provided for all the CRUDQ operations that allows for exactly-once and in-order delivery of the CRUDQ operations to the data source 106. Versioning of view instance data is performed at the mid-tier system 302. Additionally, the mid-tier system 302 tracks the latest version of the view instance data as can be stored in various states on the clients 306 and the data source 106.

In this particular implementation, the mid-tier system 302 is a central authority where all the user clients 306 can access the latest versions of data source data. In other words, the mid-tier system 302 provides a central location where data can be uniquely versioned for all data entities. In an LOB example, a user can retrieve customer data from the LOB system data source (e.g., data source 106) and cache it locally on the client machine (e.g., first client 308). The user then takes the machine offline for two weeks due to travel, for example. During those two weeks the user can still make updates to the customer information. Now consider that during those two weeks, other users from the same company can make updates to the same customer information directly. The disclosed architecture allows online and offline data operations and synchronization of the latest version of data across the clients and the data source 106.

In another LOB example, when data reaches the client (e.g., first client 308) and the data is cached in an application (e.g., an e-mail program), a compare operation on version information of the data can be quickly performed to determine if there is new data available from the LOB system (e.g., data source 106) which is cached in a client data store (not shown). Similarly, when submitting data operation requests, the request can be submitted with the version number. If the version number does not match the latest version the mid-tier system 302, the mid-tier system 302 blocks the request to the LOB system (e.g., data source 106) and notify the client that the data version it is storing is stale (outdated).

Since the mid-tier system 302 could be managed by administrators, or users who do not need access to certain information being passed between the clients 306 and the data source 106, hashing can be employed to minimize the scope of personal user data visible to the administrators, or in a place where the data is outside of the user control. Accordingly, the data received from the data source 106 or sent to the data source 106 via the mid-tier system 302 is not stored in an easily readable format. The data is hashed, and a hashed value stored on the mid-tier system 302 that allows for a quick check of the data being worked on to determine if the data has changed.

The hashed data is stored on the mid-tier system 302 as part of bookkeeping data 318 (also referred to as an image), as generated and maintained by the bookkeeping component 108. In other words, there can be an old image and an updated image. Before sending the data to the data source 106, it is desired to ensure that the old image is actually the same as the image as the data source 106. It can happen the data source image may have changed and another client machine of the user (or a different user) may have actually read the newer version of the image. Thus, an update will be performed using an old version of the data. Accordingly, by comparing the hashed values, it can be quickly determined if the hashed value (as part of the bookkeeping data 318) at the mid-tier system 302 is different from the hashed value the user request is supplying.

The mid-tier system 302 tracks bookkeeping data 318 per user per view instance. The bookkeeping data 318 comprises of a unique identifier for the view instance, a version number, a locking flag to indicate if the view instance is locked or not and the hash of the view instance data. The unique identifier for the view instance could be a composite column, and in one implementation, is assumed to be provided by the data source 106. The locking flag identifies if an operation is pending on the data source 106 for the particular view instance, and if so, subsequent operations on the view instance by the same user are blocked or rejected at the mid-tier system 302.

The hash of the view instance data enables checking of changes to the view instance data at the mid-tier system 302 without actually storing the real data. As indicated previously, use of the hash avoids the problem of creating security vulnerabilities by storing user data in a central mid-tier system 302, the need for the mid-tier system 302 to track and manage large data volumes, and the need to communicate large volumes of data.

More specifically in the context of view instance and view instance data, on a successful CRUDQ operation, the version of the associated view instance is changed at the mid-tier system 302 if the data has changed as determined by a comparison of the hash of the old view instance data (stored at the mid-tier system 302) and hash of the new view instance data (returned on successful completion of the CRUDQ invocations) effectively invalidating cached copies of the older versions of the view instance(s) on the client machines 306. Centralized versioning (e.g., at the mid-tier system 302) by means of a timestamp or a generated and tracked ID allows for unique identification of the view instance on any of the client machines 306. The mid-tier system 302 always tracks the latest version of the view instance data updates and deletes coming from client machines 306 which can have older (stale) versions of the view instance data and be rejected. Additionally, a read can be performed before update and/or delete data operations from the mid-tier system 302 to check for updates/deletes based on potentially stale view instance versions.

The basic principle in solving this online/offline data operations dilemma is that multiple data operations initiated by any of the client machines 306 on the same view instance 310 are serialized by the use of the locking scheme at the mid-tier system 302. Moreover, data versions are generated at the mid-tier system 302 in the absence of versioning exposed by the data source 106. Serialization is supported by locking at the mid-tier system 302 for concurrency control in the absence of the data source 106 participating in distributed transactions or exposing locking primitives. The use of hashing algorithm to detect when to change the mid-tier assigned version obviates the need to otherwise to store potentially large volumes of data at the mid-tier or pass potentially large volumes of data over the communications link (wired or wireless).

For handling failures during processing of CRUDQ operations, data operations can be marked as idempotent, meaning the operations can be repeatedly retried. For non-idempotent operations, error classification is provided at a granular level to differentiate errors cases (e.g., connection failure) where it is known to be safe to retry the operation.

Figure 4:
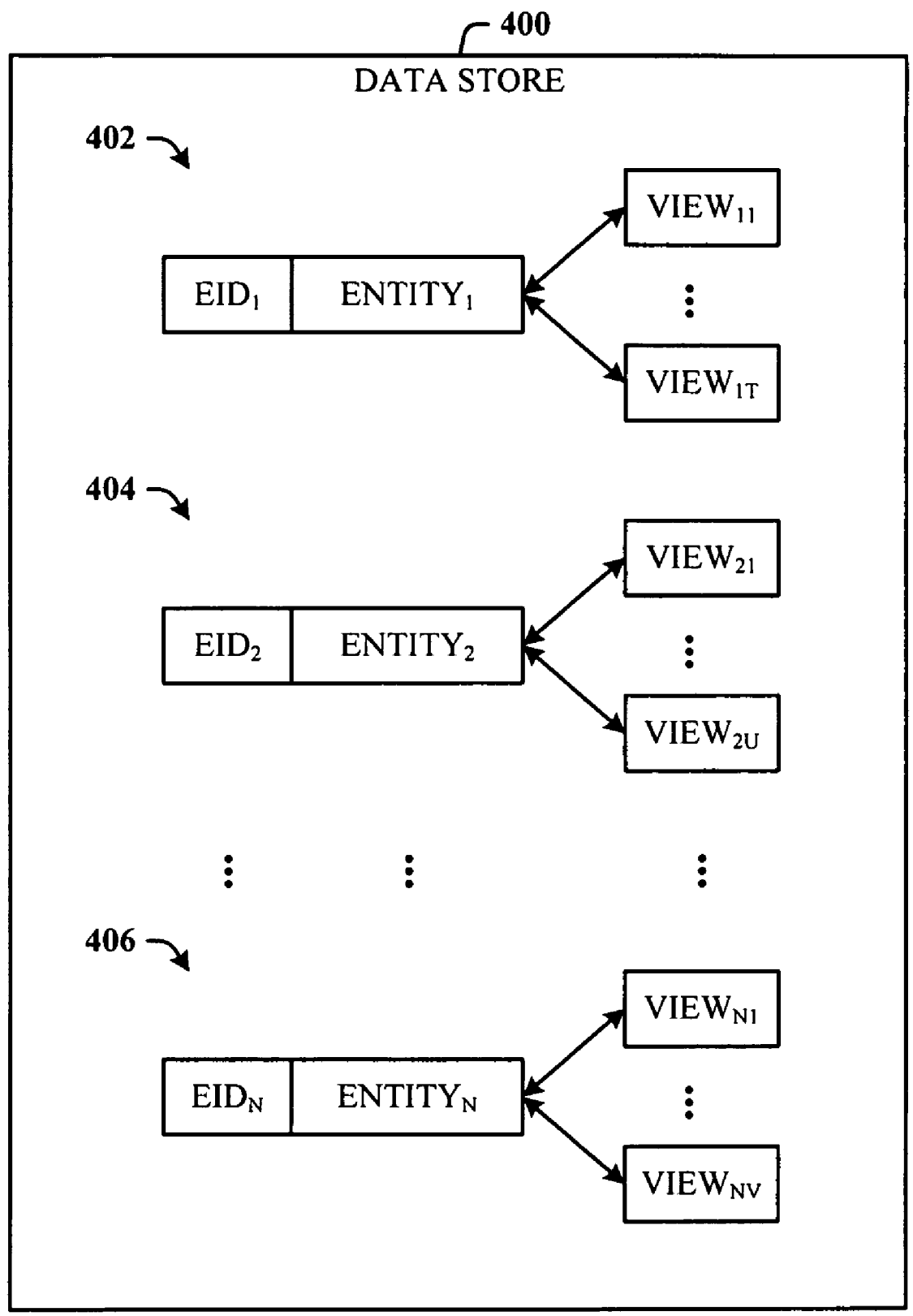
FIG. 4 illustrates an exemplary data store modeled with entities and views.

FIG. 4 illustrates an exemplary data store 400 modeled with data entities and views. As previously indicated, a data store 400 (also referred to synonymously herein as a data source, e.g., data source 106 of FIG. 1) can be modeled as comprising a collection of data entities, with each data entity having multiple defined views (where a view is the lowest unit on which CRUDQ operations can be performed). View instance data associated with a particular view can include a unique entity identifier (an entity ID or EID), the entity information (denoted ENTITY) and the view information (VIEW).

Here, the data store 400 includes a first entity set (or view instance data) 402, which comprises a first entity (denoted $ENTITY_1$), one or more entity views (denoted $VIEW_{11}, \ldots, VIEW_{1T}$, where T is a positive integer) for this first entity, and a first entity ID (denoted $EID_1$) for identification of the first entity. Similarly, the data store 400 includes a second entity set 404, which comprises a second entity (denoted $ENTITY_2$), one or more entity views (denoted $VIEW_{21}, \ldots, VIEW_{2U}$, where U is a positive integer) for this second entity, and a second entity ID (denoted $EID_2$) for identification of the second entity. As indicated, the data store 400 can include many different entities. Thus, the data store 400 includes an Nth entity set 406, which comprises a Nth entity (denoted $ENTITY_N$), one or more entity views (denoted $VIEW_{N1}, \ldots, VIEW_{NV}$) for this Nth entity, and an Nth entity ID (denoted $EID_N$) for identification of the Nth entity, where N and V are positive integers.

If the view instance data is created offline in a client machine, then the EID may not be available at the remote data source (e.g., data source 106 of FIG. 1) to readily update the desired entity table thereof. Accordingly, a temporary correlation (CID) is employed to relate the operations on the entity until the real data source system (e.g., data source 106) is accessible, and the real data source tables (of data source 106) can be updated. A table is provided that maps the CID to the entity using the entity ID (EID) until such time as the temporary CID is used to update the desired data.

Figure 5:
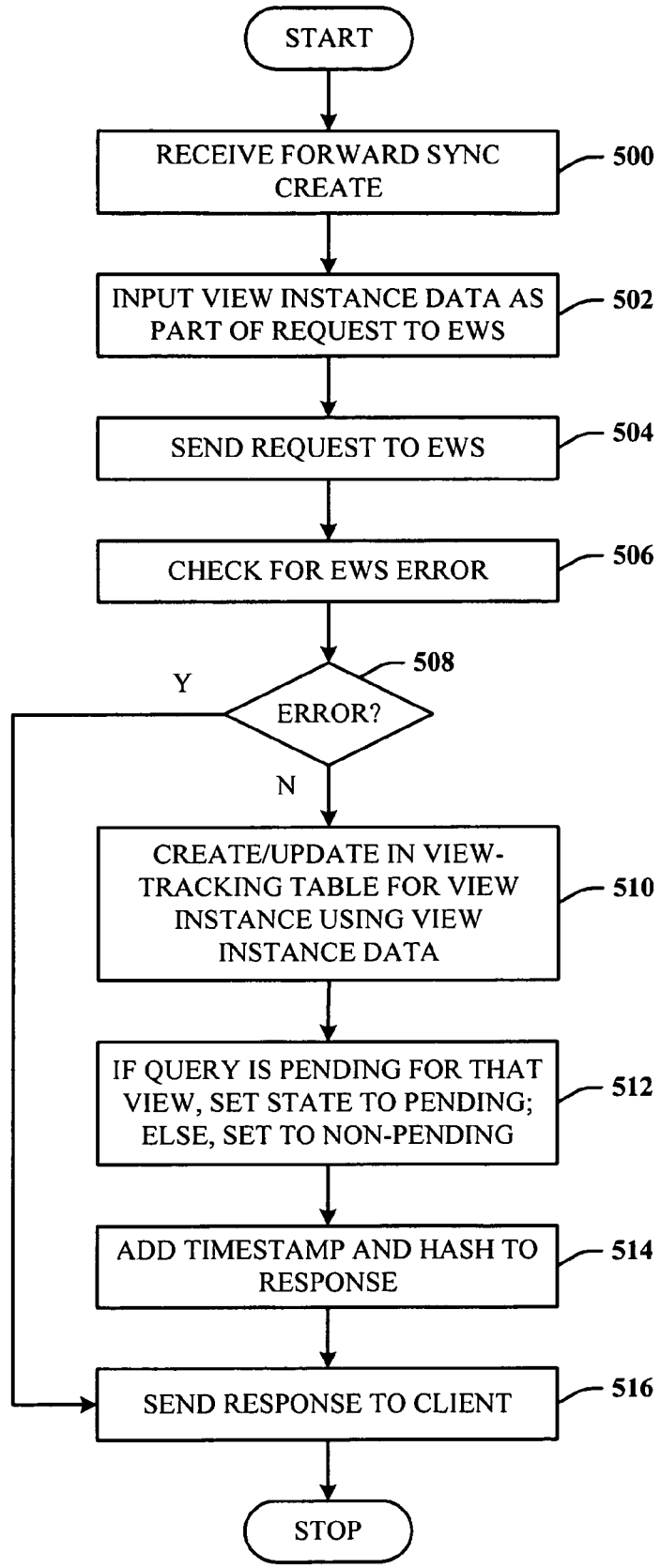
FIG. 5 illustrates a method of forward synchronization using a create data operation.

FIG. 5 illustrates a method of forward synchronization using a create data operation. At 500, a forward synchronization ("sync") create data operation is initiated from a client to a data source. At 502, view instance data is input for transmission with the request. The view instance data can include the entity ID, entity identifier (e.g., URI (uniform resource identifier)), and view name on the entity. At 504, the request is sent to the entity web services (EWS). At 506, a check is made for EWS errors. At 508, if no errors are detected, flow is to 510, where a create/update entry is made in a view tracking table (as part of the bookkeeping data). The table is a master table for tracking versions of the data being operated on. Tracking is supported using the entity URI, EID, view instance name, success information, replacement of the current timestamp at the central system bookkeeping data (e.g., mid-tier system) with the new timestamp, and hash of the returned data as new hash at the central system. Note that when reference is made to actions at the "central system" or "central location", it is to be understood that bookkeeping data stored there can be updated or checked against, accordingly. At 512, if a query is pending for that view, state is set to pending; otherwise, state is set to non-pending. In an alternative implementation, only the timestamp is added to the response. At 514, a timestamp and hash is added to a response. At 516, the response is sent to the client. If an error is detected, at 508, flow is to 516 to send the response to the client, indicating that an error has occurred.

Figure 6A:
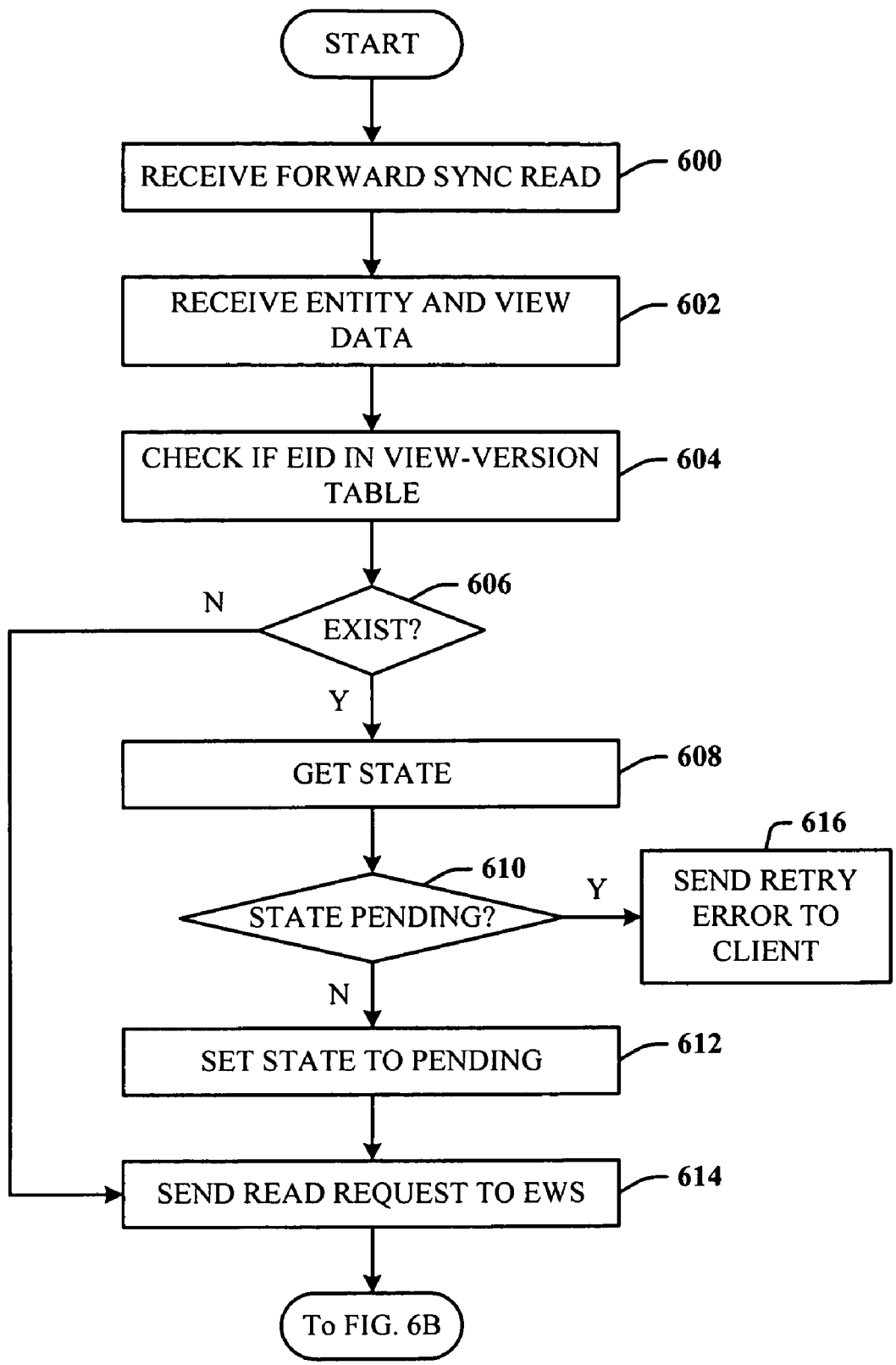
FIG. 6A and FIG. 6B illustrate a method of forward synchronization using a read data operation.
Figure 6B:
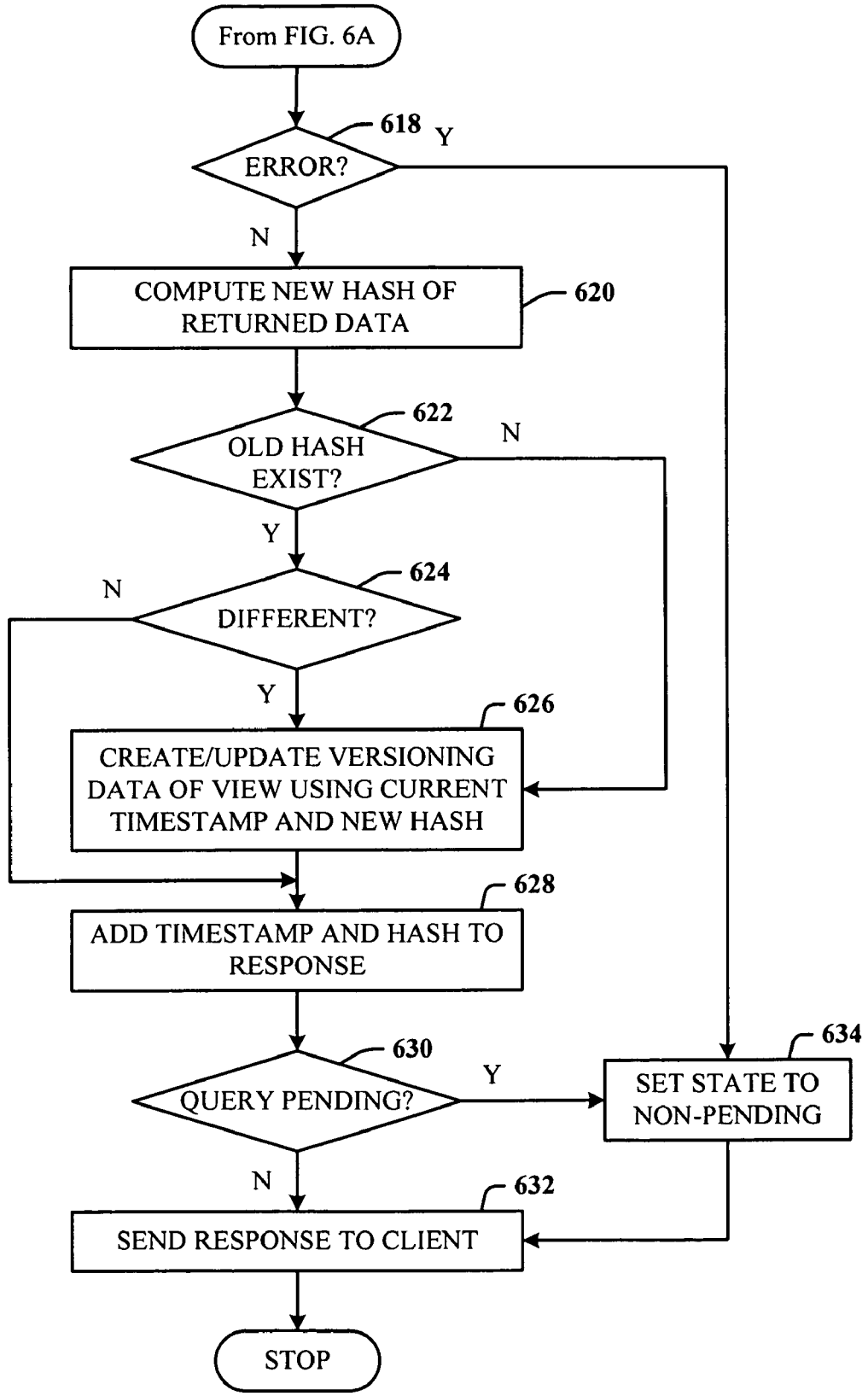

FIG. 6A and FIG. 6B illustrate a method of forward synchronization using a read data operation. At 600, a forward sync read data operation is received from a client to the data source. At 602, an input to this process is view instance data that includes EID, entity location (via entity URI) and view instance name, for example. At 604, a check is made to determine if the EID is in the central system view version table. At 606, if the EID is in the table, at 608, state information is requested. At 610, a check is made of the pending status. If not pending, flow is to 612 to set the state to pending. At 614, the read request is then sent to the EWS component. If the EID does not exist in the view versioning table, flow is from 606 to 614, the send the read request to the EWS. If the state information indicates that the state is pending, flow is from 610 to 616, a retry error is sent to the client indicating that a retry can be processed at a later time.

Moving to FIG. 6B, the system then checks for an error from the EWS. If an error is not detected, at 618, flow is to 620 to compute a new hash value of the returned data. At 622, a check is made for an old hash, and if it does exist, flow is to 624 to further check if the old hash is different. If yes, at 626, version information is created/updated at the central location using the current timestamp and new hash value. At 628, a response is created and, the current timestamp and hash is added to the response. At 630, a check is made for a pending query. If a query is not pending, flow is to 632 to send the response the client. If a query is pending, flow is from 630 to 634 to set the state to non-pending, and the response is then sent to the client, as indicated at 632.

If an error was detected, flow is from 618 to 634 to set the state to non-pending, and then to 632 to send the response to the client. If, at 622, the old hash does not exist, flow is to 626 to again, process the version information. If the old hash is not different from the existing new hash, flow is from 624 to 628 to add the timestamp and hash to the response, and send the response to the client, at 632. In an alternative implementation, only the timestamp is added to the response.

Figure 7A:
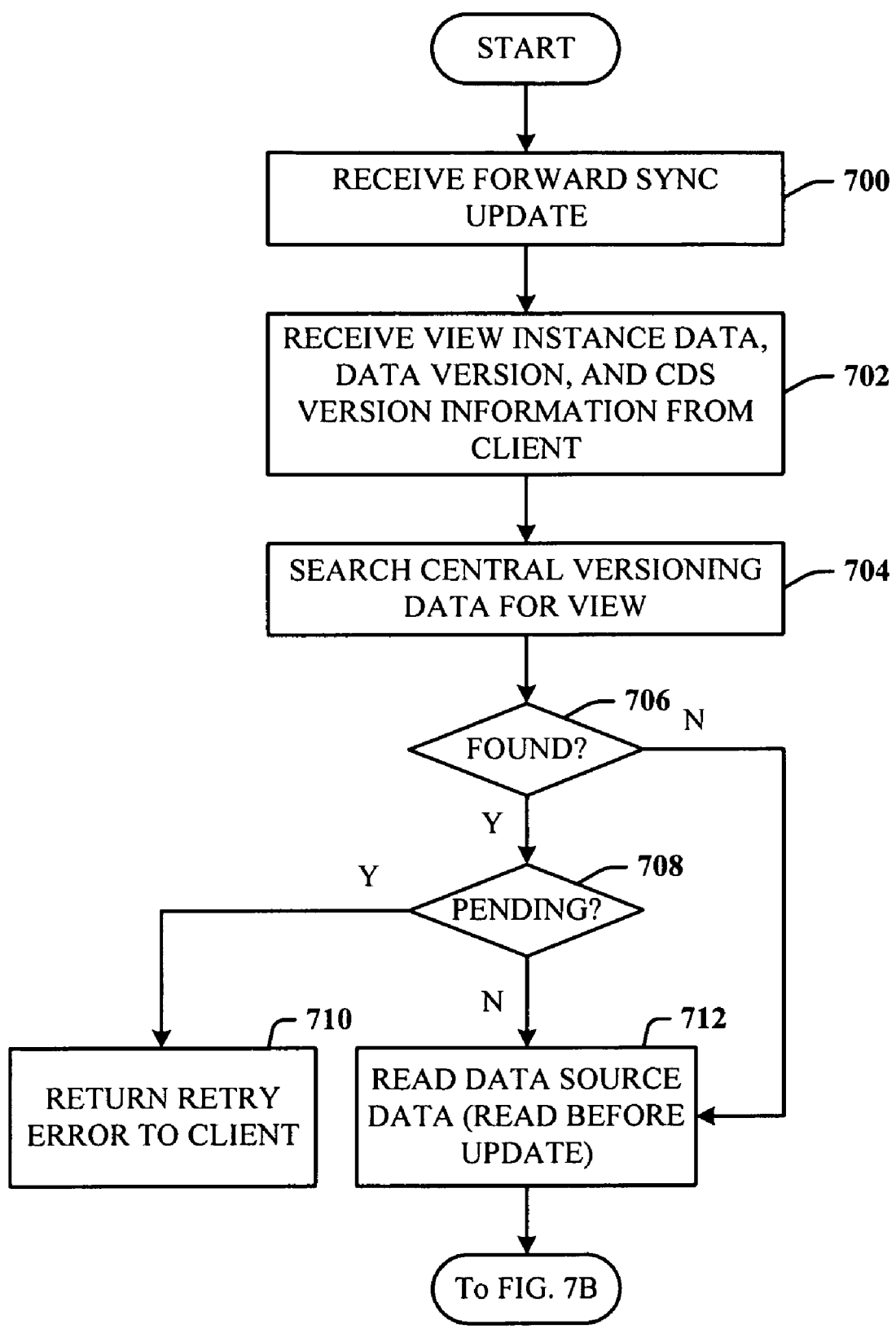
FIG. 7A and FIG. 7B illustrate a method of forward synchronization using an update data operation.
Figure 7B:
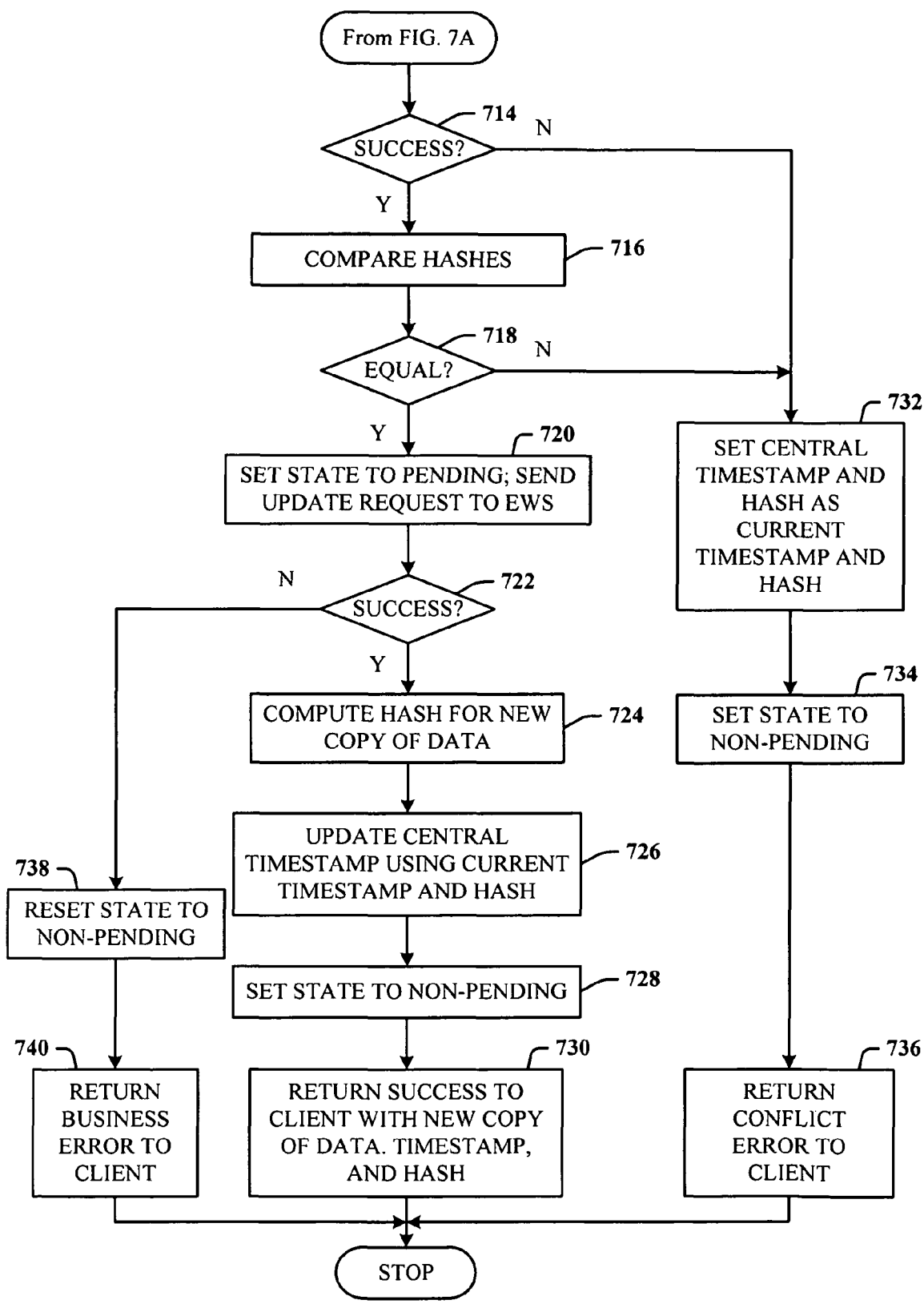

FIG. 7A and FIG. 7B illustrate a method of forward synchronization using an update data operation. Briefly, the client side passes current data, client-side hash information, and EID for UPDATE request to the central system. The central system reads the data source data (of LOB system) and calculates the hash. If the hash is different from the central system, then a conflict is detected, the timestamp and hash at the central system for this view are updated, and a conflict is raised to client with the data source data. Otherwise, the data source data is updated. If a success is returned, then a new copy of data is returned to client and the central system version tracking information is updated accordingly. If not successful, then an error code is returned to client. State is set to pending when the central system has compared the remote hash to the client-supplied hash. This state ensures that only one client can enter the algorithm exclusively. Before the call returns to the client, the state is reset to be pending or non-pending to allow the next operation on this specific view to proceed.

At 700, a forward sync update data operation is received at the central location from the client. At 702, information is passed from the client to the central system, which includes the view instance data, current version of the data (at the client) and versioning information stored on the client data store (CDS). At 704, the central system version information is searched for this view instance. If the view is found, at 706, flow is to 708 to determine if the state is pending. If pending, flow is to 710 to return a retry error notification to the client. If the view is found and the state is not pending, flow is to from 708 to 712 to read the data source data (a read before update process). If not found, at 706, flow is to 712 to read the data source data.

Turning to FIG. 7B, if the read-before-update was successful, at 714, flow is to 716 to compare the hashes. If the hashes are equal, as checked at 718, flow is to 720 to send a request to the EWS. If successful, at 722, a new copy of the data is obtained and the hash computed, as indicated at 724. The central timestamp is then updated using the current timestamp and hash, as indicated at 726. At 728, the state is set to non-pending. At 730, a success message is returned to the client with a new copy of data, the timestamp information, and hash.

If, at 714, the data cannot be read successfully, flow is to 732 to set the timestamp and hash of the central system as current. At 734, the state is set to non-pending. Flow is then to 736 to send a conflict error to the client.

If, at 718, the hashes are not equal, flow is to 732 to process the timestamps, hash, and states, as described before. If, at 722, the update request to the EWS was not successful, flow is to 738 to reset the state to non-pending. At 740, a business error is then returned to the client.

Figure 8:
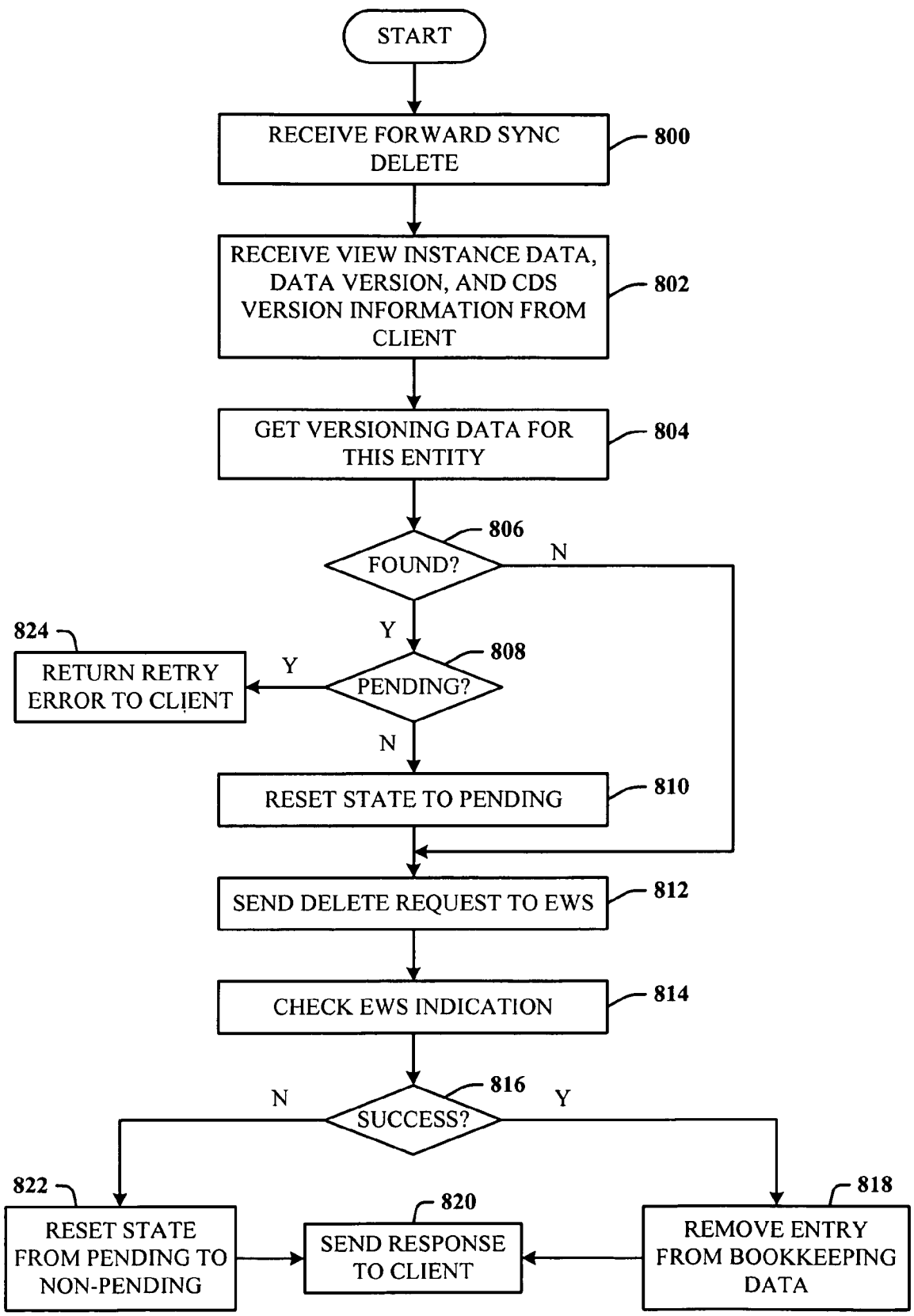
FIG. 8 illustrates a method of forward synchronization using a delete data operation.

FIG. 8 illustrates a method of forward synchronization using a delete data operation. Delete only checks for locked "entities" in the bookkeeping data. If there are any views corresponding to the EID that are locked on the bookkeeping data of the central system, the delete call will fail with a retry-later error. Delete does not check for a timestamp and hash at the central system bookkeeping data. The behavior of delete is different from update because update is a view operation whereas delete is an entity operation.

At 800, a forward sync delete data operation is received. At 802, data passed from the client to the central system includes view instance data, current version data, and versioning information stored at the CDS. At 804, a search is conducted at the central system for versioning information for this view instance. At 806, if found, flow is to 808 to check if the state is pending. If not, at 810, the state is reset to pending. At 812, a delete request is sent to the EWS from the central system. At 814, a check is made for a success indication from the EWS. If successful, at 816, flow is to 818 to remove the entry from the central system bookkeeping data. At 820, a response is then sent to the client. If not successful, at 816, flow is to 822 to reset the state from pending to non-pending.

At 806, if the versioning information for this view instance is not found, flow is to 812 to send the delete request, and proceed as before. In an alternative implementation, if the versioning data is not found, an error can be returned to the client about an unknown view. At 808, if the state is pending, flow is to 824 to return a retry error message to the client.

Figure 9:
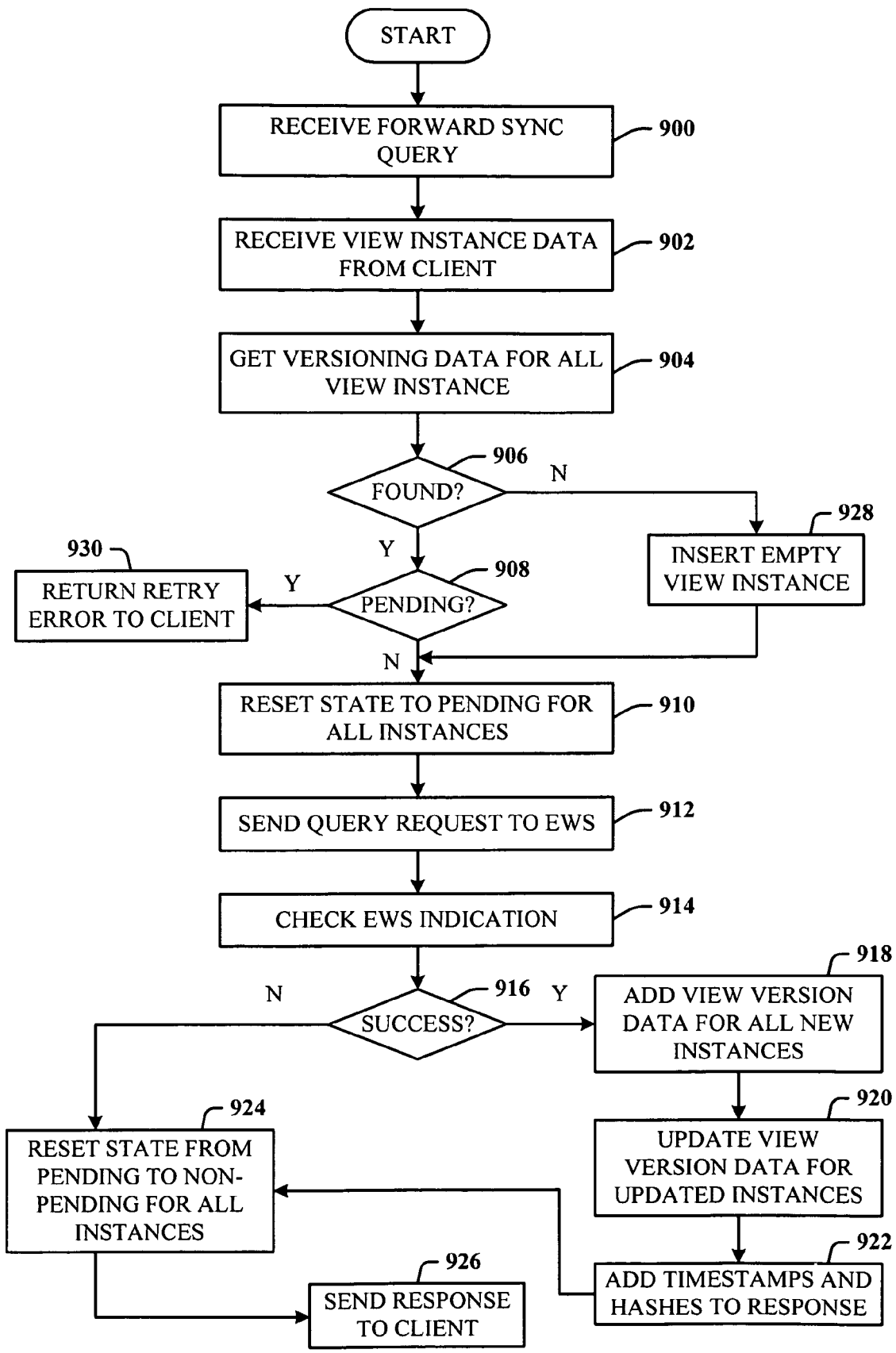
FIG. 9 illustrates a method of forward synchronization using a query data operation.

FIG. 9 illustrates a method of forward synchronization using a query data operation. Briefly, when a query is received at the central system, lock is checked for all instances of the view. If there is lock on any of the view instances, the query will fail with retry error message. Otherwise, lock is taken on all the instances of the view. If there is no instance found, and "empty" instance is inserted in the central system (e.g., mid-tier) and locked. The call is then released to EWS. When the response comes back from the EWS, the new instances (instances which were not present in bookkeeping data (e.g., of the mid-tier)) are inserted into the view version table with the present timestamp. For the existing instances, if the hash has not changed, no changes are made in the view version table. For the existing instances, if the hash has changed, new hash and timestamp information is updated.

The view version table tracks versioning information per view, by providing the following information: Entity URI (a string); EntityID (a string); ViewName (a string); MidTier-TimeStamp (the timestamp to track data change—this can be defined as a binary(8) instead of timestamp to make this value settable); Hash (varbinary, hash value of view data); Lock (a bit indicate whether a view instance is locked or not; and LockTimeout (a timestamp at which the locking will expire). Note that there can be another column (notification) added to this table to support caching instructions. Notification is a string, where its value can be AddToCache, RemoveFromCache and ChangeCachedValue.

At 900, a forward sync query data operation is received at the central system from the client. At 902, view instance data is received from the client. At 904, versioning data is searched for all view instances. At 906, if found, flow is to 908 to check state. If not pending, flow is from 908 to 910 to reset state to pending for all view instances. At 912, a query request is sent from the central system to the EWS. At 914, a success indication is checked for at the EWS. If successful, at 916, flow is to 918 to add view version table data (hash, timestamp) for all new instances. At 920, the view version table data (hash, timestamp) is updated for the updated instances. At 922, timestamps and hashes are added to the response (e.g., in the header). At 924, the state is reset from pending to non-pending for all instances. At 926, the response is sent to the client.

If the versioning data is not found at 906, flow is to 928 to insert an "empty" view instance. Flow then continues to 910 to reset state to pending, and proceed as previously described. If the versioning data is found and state is pending, flow is from 908 to 930 to return a retry error message to the client. If the EWS indicates unsuccessful, flow is from 916 to 924 to reset the state from pending to non-pending for all view instances. The response to the client then includes this state information.

It is realized that the central (or mid-tier) system could crash, and as a result central data (e.g., hash and timestamp) could be lost. In case data has been lost at central system, subsequent READ/QUERY messages will generate new timestamp and hash data at the central system (or mid-tier). In an UPDATE operation, hash or timestamp information stored at the central system is not required to be used for conflict detection. The central system can issue a READ at the remote system (e.g., LOB system) and calculate a new hash based on the READ. Conflict detection is then performed based on the new hash. By not using hash/timestamp stored at central system for an UPDATE operation, this ensures that the timestamp and hash information are not mission critical data, and clients can issue CRUDQ operations even when data has been lost at the central (e.g., mid-tier) system.

Figure 10:
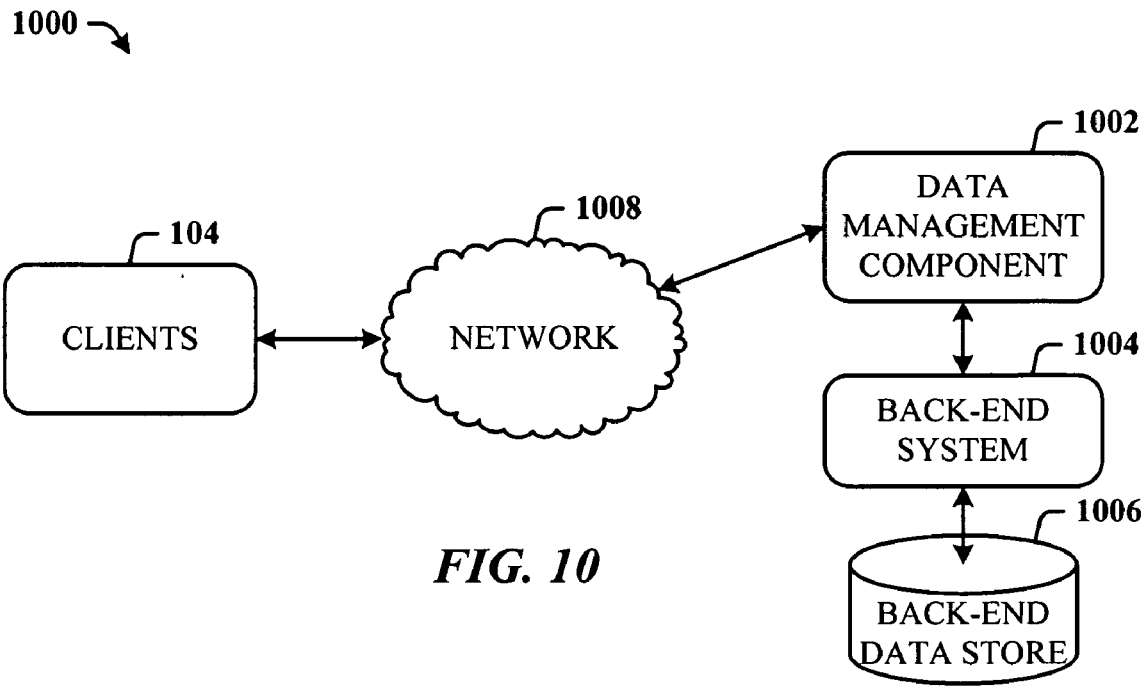
FIG. 10 illustrates an alternative implementation where a data management component resides at a back-end system for versioning and concurrency control.
Figure 11:
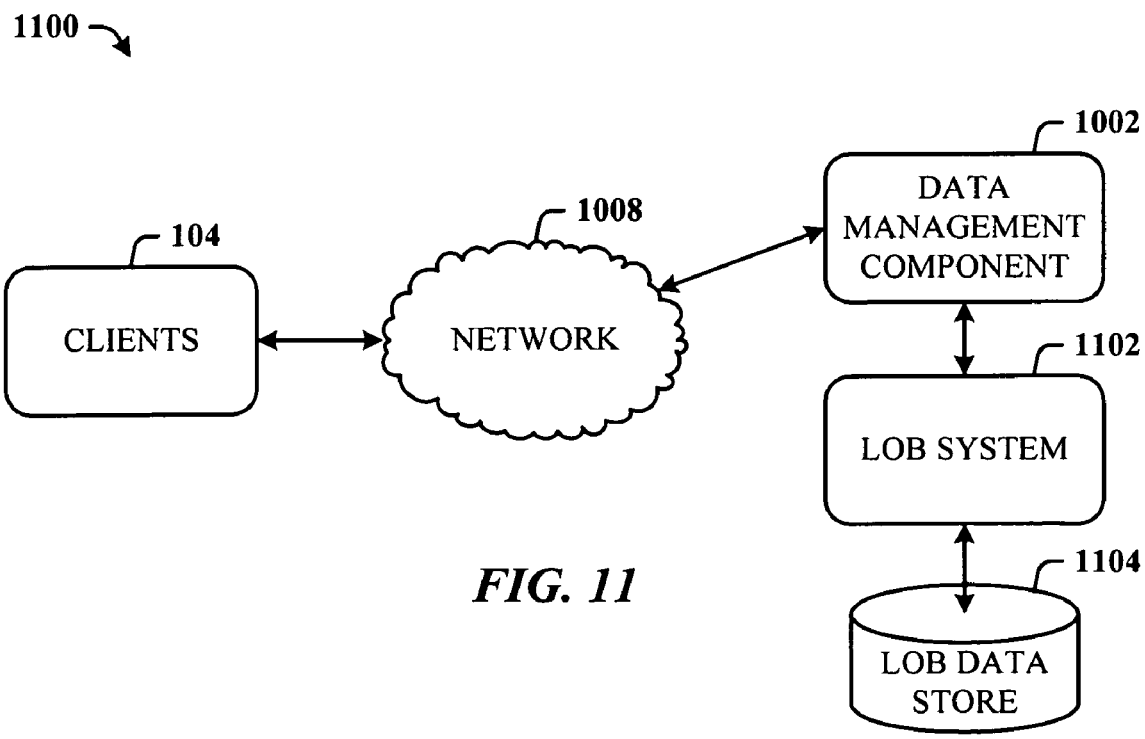
FIG. 11 illustrates an alternative implementation where the data management component resides on an LOB system for versioning and concurrency control.
Figure 12:
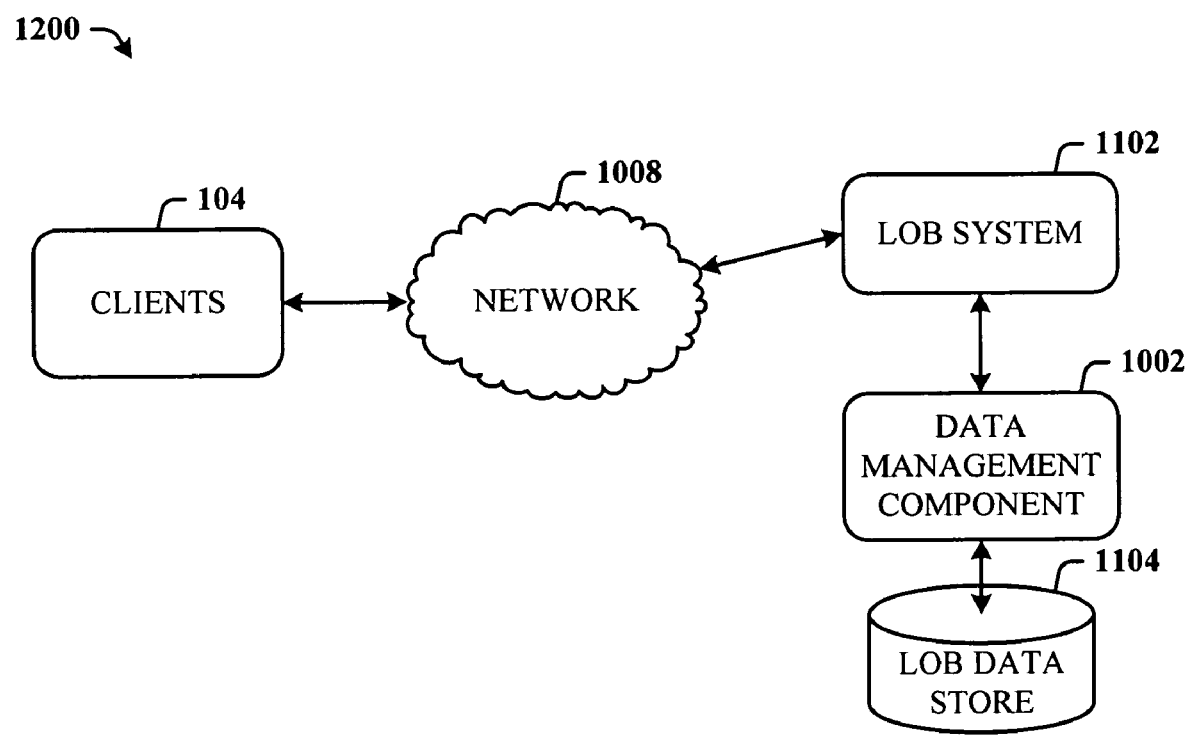
FIG. 12 illustrates an alternative implementation where the data management component resides on the LOB data store system of the LOB system for versioning and concurrency control.

FIGS. 10-12 illustrate alternative implementations. In other words, the versioning and concurrency control architecture does not require a separate mid-tier (or central system). The disclosed capability can be sited according to these alternative implementations.

FIG. 10 illustrates an alternative implementation 1000 where a data management component 1002 resides at a back-end system 1004 for versioning and concurrency control. Although not shown, the data management component 1002 includes the capability for centralized versioning and concurrency control provided by the interceptor component, bookkeeping component, and control component of FIG. 1. Here, the clients 104 are accessing view instance data of a back-end data store 1006 of the back-end system 1004 over a network 1008. The data management component 1002 intercepts messages between the clients 104 and the back-end system 1004 as described supra, checks for version information, updates bookkeeping data of the data management component 1002, rejects client requests, provides serialization, facilitates client equivalency, and so on. The management component 1002 can be a loadable module that installs on the back-end system 1004, for example.

FIG. 11 illustrates an alternative implementation 1100 where the data management component 1002 resides on a LOB system 1102 for versioning and concurrency control. Although not shown, the data management component 1002 includes the capability for centralized versioning and concurrency control provided by the interceptor component, bookkeeping component, and control component of FIG. 1. Here, the clients 104 are accessing view instance data of a LOB data store 1104 of the LOB system 1102 over the network 1008. The data management component 1002 intercepts messages between the clients 104 and the LOB system 1102 as described supra, checks for version information, updates bookkeeping data of the data management component 1002, rejects client requests, provides serialization, facilitates client equivalency, and so on. The management component 1002 can be a loadable module that installs on the LOB system 1102, for example.

FIG. 12 illustrates an alternative implementation 1200 where the data management component 1002 resides in the LOB data store system 1104 of the LOB system 1102 for versioning and concurrency control. Although not shown, the data management component 1002 includes the capability for centralized versioning and concurrency control provided by the interceptor component, bookkeeping component, and control component of FIG. 1. Here, the clients 104 are accessing view instance data of a LOB data store 1104 of the LOB system 1102 over the network 1008. The data management component 1002 is disposed in the data store system 1104 and intercepts messages between the clients 104 and the LOB system 1102 as described supra, checks for version information, updates bookkeeping data of the data management component 1002, rejects client requests, provides serialization, facilitates client equivalency, and so on. The management component 1002 can be a loadable module that installs on the LOB data store system 1104, for example.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
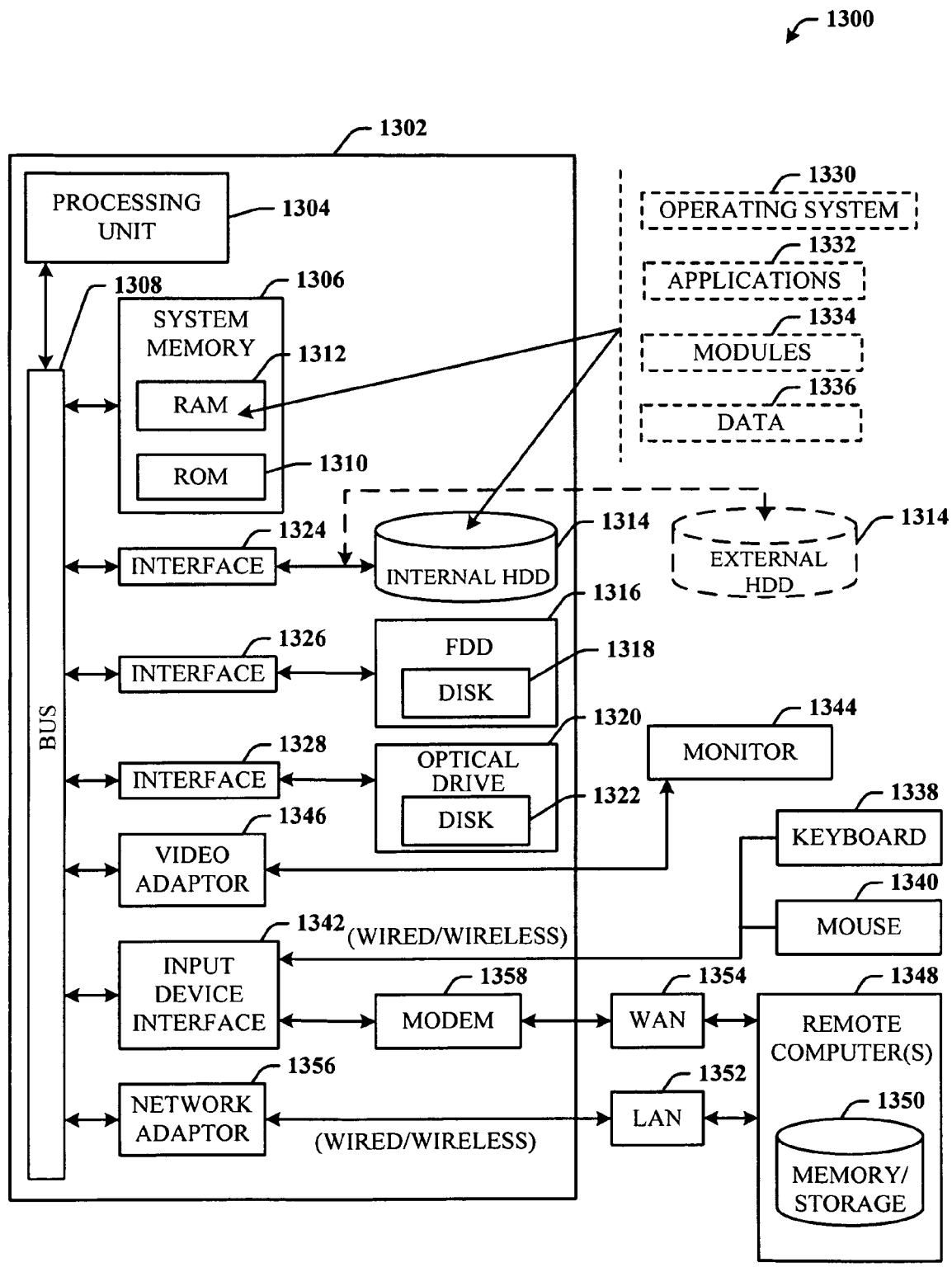
FIG. 13 illustrates a block diagram of a computing system operable as a central system for versioning and concurrency control in accordance with the disclosed innovative architecture.

Referring now to FIG. 13, there is illustrated a block diagram of a computing system 1300 operable as a central system for versioning and concurrency control in accordance with the disclosed innovative architecture. In order to provide additional context for various aspects thereof, FIG. 13 and the following discussion are intended to provide a brief, general description of a suitable computing system 1300 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary computing system 1300 for implementing various aspects includes a computer 1302, the computer 1302 including a processing unit 1304, a system memory 1306 and a system bus 1308. The system bus 1308 provides an interface for system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1312, including an operating system 1330, one or more application programs 1332, other program modules 1334 and program data 1336. For example, the disclosed versioning and concurrency architecture can be embodied as a module 1334 for install on the desired central systems. All or portions of the operating system, applications, modules, and/or data can also be cached in the RAM 1312. It is to be appreciated that the innovation can be implemented with various commercially available operating systems or combinations of operating systems.

A user can enter commands and information into the computer 1302 through one or more wired/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 14:
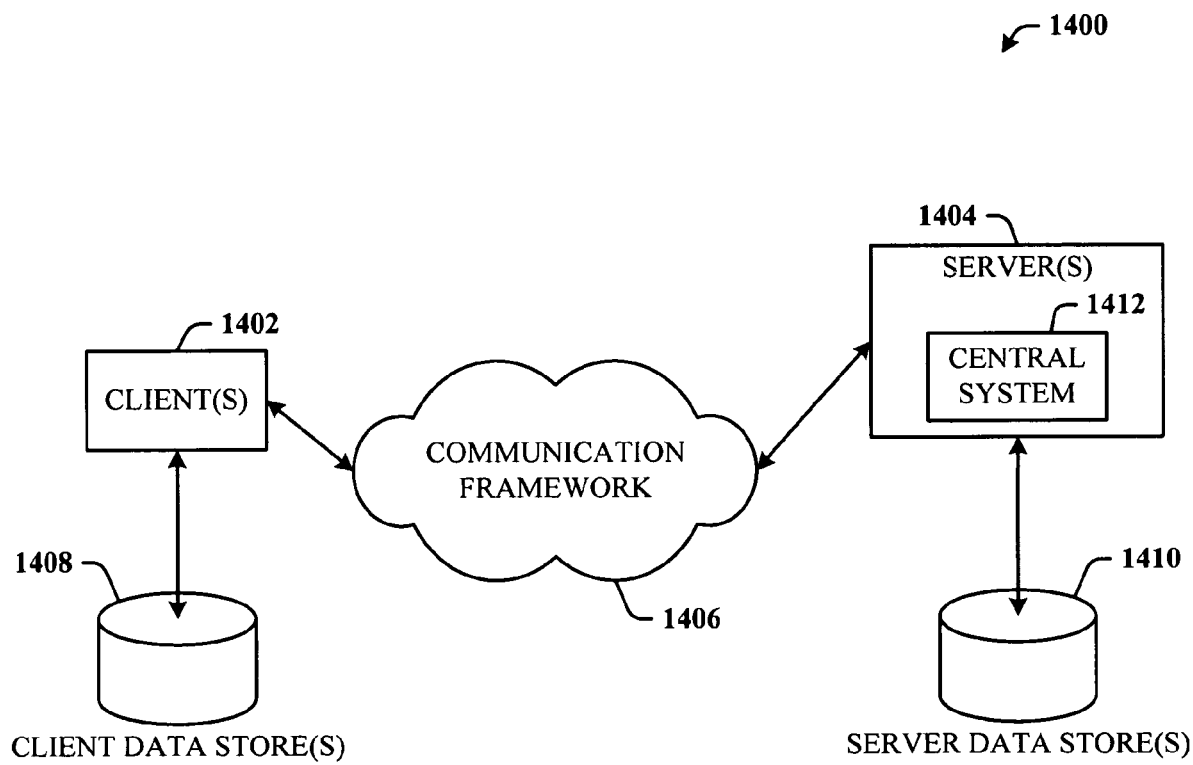
FIG. 14 illustrates a schematic block diagram of an exemplary computing environment that facilitates connectivity for centrally-located (e.g., mid-tier) versioning and concurrency control.

Referring now to FIG. 14, there is illustrated a schematic block diagram of an exemplary computing environment 1400 that facilitates connectivity for centrally-located (e.g., midtier) versioning and concurrency control. The system 1400 includes one or more client(s), which can be hardware and/or software (e.g., threads, processes, computing devices). The client(s) 1402 can house cookie(s) and/or associated contextual information by employing the subject innovation, for example.

The system 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The clients 1402 (similar to the clients 104 and 306) are capable of performing CRUDQ data operations on data of server data store(s) 1410. A central system 1412 facilitates interception of the client calls to the server data stores 1410 and from the server data stores to the clients 1408. The central system 1412 includes the bookkeeping data, control component, interceptor component and bookkeeping component described supra for versioning and concurrency control as described herein.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage medium storing computer-executable program instructions that, when executed, cause a computing device to perform a method of managing data, the method comprising:
    intercepting data operation messages and view instance data between a set of clients and a data source storing data having a view instance, the data operation messages defining data operations on the data stored at the data source, the view instance data identifying a client and a client view instance of the data;
    generating bookkeeping data for the client and the client view instance of the data from the view instance data intercepted from the client;
    comparing the bookkeeping data generated for the client and the client view instance of the data to stored bookkeeping data associated with a version of the view instance of the data stored at the data source;
    tracking and maintaining bookkeeping data associated with updated versions of the view instance of the data stored at the data source based on changes to the data stored at the data source made according to the data operations defined by the data operation messages intercepted from the set of clients and the client view instances of the data; and
    controlling access to the view instance of the data stored at the data source based on the bookkeeping data generated for the client and the client view instance of the data.

2. The computer-readable storage medium of claim 1, wherein the set of clients are of a single user, and the clients can operate independently on a similar data entity.

3. The computer-readable storage medium of claim 1, further comprising computer-executable program instructions for employing locking for concurrency control.

4. The computer-readable storage medium of claim 1, further comprising computer-executable program instructions for:
    tracking version information of the view instance of the data stored at the data source at an intermediate location; and
    rejecting update and delete operations requested from a client based on comparison, at the intermediate location, of the version information of the view instance of the data stored at the data source and a stale client view instance of the data identified by the view instance data supplied by the client.

5. The computer-readable storage medium of claim 1, further comprising computer-executable program instructions for:
    generating a hash value associated with the client view instance from the view instance data intercepted from the client, and
    comparing the hash value associated with the client view instance to a stored hash value associated with the version of the view instance of the data stored at the data source.

6. The computer-readable storage medium of claim 1, wherein the data operations comprise one or more of: create, read, update, delete, and query on the data.

7. The computer-readable storage medium of claim 1, further comprising computer-executable program instructions for providing granular error classification for distinguishing connectivity failures and enabling retry of non-idempotent operations.

8. The computer-readable storage medium of claim 1, wherein the booking data associated with the version of the view instance of the data stored at the data source includes one or more of: a unique ID for a view instance of the data, a version number associated with the view instance, a flag associated with a locking operation on the view instance, and hash of the view instance.

9. The computer-readable storage medium of claim 1, further comprising computer-executable program instructions for intercepting calls to the data source from the set of clients and responses from the data source to the set of clients.

10. The computer-readable storage medium of claim 1, further comprising computer-executable program instructions for serializing the data operations on the data stored at the data source.

11. The computer-readable storage medium of claim 1, wherein the computing device is included in an always-on mid-tier system.

12. A computer-implemented method of managing data, comprising:
    intercepting, at a computing device, data operation messages and view instance data between multiple clients and a data source storing data having a view instance, the data operation messages defining data operations on the data stored at the data source, the view instance data identifying a client and a client view instance of the data;
    generating bookkeeping data for each client and each client view instance of the data from the view instance data intercepted from each client;
    comparing the bookkeeping data generated for each client and each client view instance of the data to stored bookkeeping data associated with a version of the view instance of the data stored at the data source;
    tracking the data operations directed by the multiple clients to the data stored at the data source;
    maintaining bookkeeping data associated with updated versions of the view instance of the data stored at the data source based on changes to the data stored at the data source made according to the data operations defined by the data operation messages intercepted from the multiple clients and the client view instances of the data; and
    controlling access to the view instance of the data stored at the data source based on the bookkeeping data generated for each client and each client view instance of the data.

13. The method of claim 12, further comprising providing a version number associated with the view instance of the data stored at the data source.

14. The method of claim 12, further comprising:
    hashing the view instance data intercepted from each client to generate hash values associated with the client view instances of the data; and controlling access of the multiple clients to the view instance of the data stored at the data source based on the hash values associated with the client view instances of the data.

15. The method of claim 12, further comprising reading the view instance data of one of the multiple clients before performing an update or delete data operation on the view instance of the data stored at the data source.

16. The method of claim 12, further comprising uniquely identifying each client view instance of each of the multiple clients using version information.

17. The method of claim 12, further comprising:
tracking version information of the view instance of the data stored at the data source at an intermediate location; and
rejecting update and delete data operations requested from a client based on comparison, at the intermediate location, of the version information of the view instance of the data stored at the data source and a stale client view instance of the data identified by the view instance data supplied by the client.

18. The method of claim 12, further comprising controlling concurrency by setting a locking flag that represents pendency of a data operation on the view instance of the data stored at the data source.

19. The method of claim 12, further comprising serializing multiple data operations on the view instance of the data stored at the data source for exactly-once and in-order delivery of the multiple data operations.

20. A computing device located interstitial to a set of clients and a data source storing data having a view instance, the computing device comprising:
memory storing computer-executable program instructions; and
one or more processors for executing the computer-executable program instructions stored in the memory and performing a method of managing data comprising:
intercepting data operation messages and view instance data between the set of clients and the data source, the data operation messages defining data operations on the data stored at the data source, the view instance data identifying a client and a client view instance of the data;
providing messaging and distributed transaction controls for the data source;
generating bookkeeping data for the client and the client view instance from the view instance data intercepted from the client;
comparing the bookkeeping data generated for the client and the client view instance of the data to stored bookkeeping data associated with a version of the view instance of the data stored at the data source;
tracking data operations on the data stored at the data store per user and per client view instance;
maintaining bookkeeping data associated with updated versions of the view instance of the data stored at the data source based on changes to the data stored at the data source made according to the data operations defined by the data operation messages intercepted from the set of clients and the client view instances of the data; and
controlling access to the view instance of the data stored at the data source based on the bookkeeping data generated for the client and the client view instance of the data.

* * * * *